United States Patent [19]
Kitahara et al.

[11] Patent Number: 6,130,177
[45] Date of Patent: Oct. 10, 2000

[54] WET FRICTION MATERIAL

[75] Inventors: Shun Kitahara; Shigeki Umezawa, both of Shizuoka, Japan

[73] Assignee: NSK-Warner Kabushiki Kaisha, Tokyo, Japan

[21] Appl. No.: 09/173,762

[22] Filed: Oct. 16, 1998

[30] Foreign Application Priority Data

Oct. 16, 1997 [JP] Japan .................................. 9-283882

[51] Int. Cl.⁷ .............................. F16D 69/02; F16D 65/00
[52] U.S. Cl. ........................ 442/334; 442/332; 442/333; 442/352; 442/354
[58] Field of Search ........................... 188/251; 428/392, 428/32, 298.4; 442/332, 334, 333, 352, 354

[56] References Cited

U.S. PATENT DOCUMENTS 5,495,922   3/1996   Booher et al. ........................ 188/251

*Primary Examiner*—Richard Weisberger
*Attorney, Agent, or Firm*—Sughrue, Mion, Zinn, Macpeak & Seas, PLLC

[57] ABSTRACT

In a wet friction material formed from carbon fibers as a main ingredient and synthetic organic highly-fine fibers as reinforcing material, the carbon fibers as a main ingredient are formed into a shape. Further, the compounding ratio of each of the carbon fibers and the reinforcing material is made to be within a range from 10 to 50% with respect to paper ingredients.

7 Claims, 2 Drawing Sheets

WET FRICTION MATERIAL

BACKGROUND OF THE INVENTION

1. Field of the Invention

The present invention relates to a wet friction material used for a clutch, a brake or the like in a wet friction engagement device.

2. Description of the Related Art

In order to understand the present invention, an example of a wet friction engagement device is illustrated in FIG. 3. In FIG. 3, a driving plate 2 engaged with a spline portion 51 of a hub 5 fitted to an input shaft 6 comes into contact with a driven plate 1 engaged with a spline portion 41 of a retainer 4, so that torque is transmitted. The reference numeral 3 represents a pressure plate; and 7, a piston for applying pressure.

In view of current energy and environmental problems and the like, such a friction engagement device is required to be small in size and light in weight, small in operating shock, and high in torque capacity. At the same time, the friction engagement device is required to cope with high energy of a car engine with high-velocity rotation and high output of the same. The requirement is extremely high.

A friction material to be stuck onto the surface of a driving plate and a driven plate was formed from natural pulp or synthetic organic fibers (aramide fibers, etc.) as a base material.

That is, practical examples of the compounding ratio in a conventional friction material are as follows. In a first example (referred to as "Example J-1"), the friction material is composed of natural pulp by 35%, synthetic organic fibers by 5%, a filler by 30%, and phenol resin by 30%. In a second example (referred to as "Example J-2"), the friction material is composed of natural pulp by 20%, synthetic organic fibers by 20%, a filler by 30%, and phenol resin by 30%.

Synthetic organic fibers such as aramide fibers are expensive while they are superior in heat resistance. The compounding ratio of the synthetic organic fibers tends to increase in order to improve the heat resistance, so that the price has risen correspondingly. Accordingly, it was considered to use carbon fibers to reduce the price. Carbon fibers are however rigid and do not intertwine with each other or with any other fibers.

Accordingly, there was a defect that the strength of friction material was insufficient, so that it could not be made up into a product. Further, it was impossible to avoid various problems that the heat radiation and flexibility were not as good as expected, and the like.

SUMMARY OF THE INVENTION

It is an object of the present invention to provide a wet friction material which has superior heat resistance and sufficient strength and endurance, and the price of which can be reduced.

A wet friction material according to the present invention comprises carbon fibers and synthetic organic highly-fine fibers. The carbon fibers is as a main ingredient and the synthetic organic highly-fine fibers is as reinforcing material. The carbon fibers as a main ingredient are formed into a wave-shape.

DETAILED DESCRIPTION OF THE INVENTION

Detailed description of the present invention will be described as follows.

According to the present invention, provided is a wet friction material formed from carbon fibers as a main ingredient and synthetic organic highly-fine fibers as reinforcing material, wherein the carbon fibers as a main ingredient are formed into a wave-shape. Further, the compounding ratio of each of the carbon fibers and the reinforcing material is made to be within a range of from 10 to 50% with respect to paper ingredients.

Figure 4A:
FIGS. 4A and 4B show the shape of a wave-shaped carbon fiber, respectively.
Figure 4B:
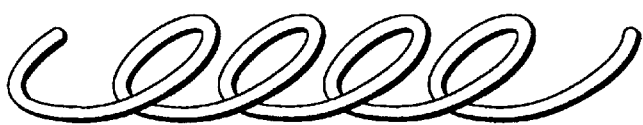

In the present invention, wave-shaped carbon fibers are formed into a wavy shape (FIG. 4A), a curly shape (FIG. 4B) or the like. It is preferable to make the length of carbon fibers not longer than 6 mm, and properly about 3 mm. It is preferable that the amount of wave-shaped carbon fibers is, at least, not smaller than half of the whole carbon fibers.

EXAMPLES

Examples of the compound of the wet friction material according to the present invention is as follows. In a first example (referred to as "Example H-1"), the wet friction material is composed of carbon fibers by 20%, and synthetic organic fibers by 40%. In a second example (referred to as "Example H-2"), the wet friction material is composed of carbon fibers by 30%, and synthetic organic fibers by 30%. In a third example (referred to as "Example H-3"), the wet friction material is composed of carbon fibers by 40%, and synthetic organic fibers by 20%. In each of the three Examples H-1 to H-3, the rest ingredients contain a filler by 20%, and phenol resin by 20%.

In the above examples, carbon fibers are formed into a wavy shape. These wave-shaped carbon fibers as a main ingredient intertwine with each other or intersect each other at least at one point in paper made into a sheet in a wet process. It is preferable that all the carbon fibers are wavy, but if at least half of the carbon fibers are wavy, the residual carbon fibers may be rigid as in conventional case, or may be activated carbon fibers.

Figure 1:
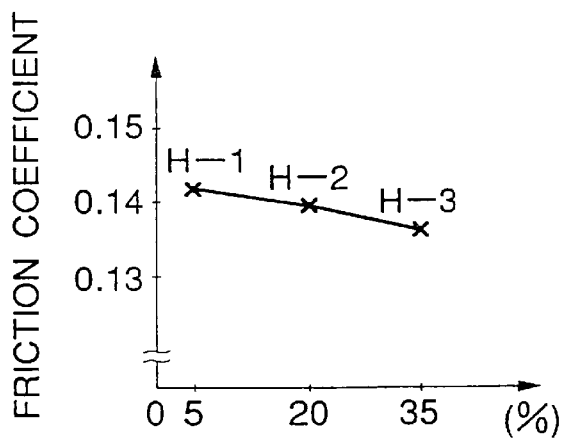
FIG. 1 is a graph showing a change of a friction coefficient in accordance with the loadings of carbon fibers.

FIG. 1 shows a change of the fiction coefficient in accordance with the loadings of the carbon fibers. The ordinate indicates the friction coefficient, and the abscissa indicates the compounding ratio of the carbon fibers. It is understood from FIG. 1 that there is little difference in friction coefficient among Examples H-1 to H-3.

Figure 2:
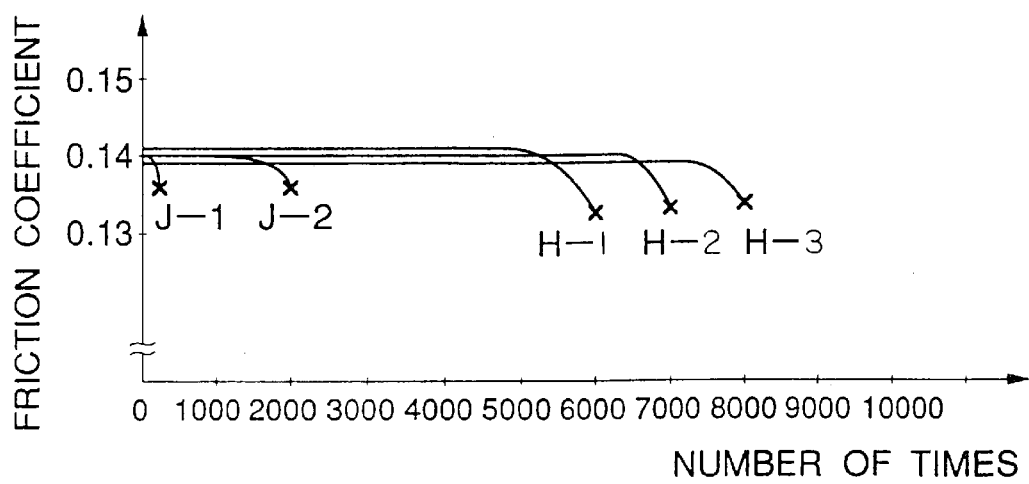
FIG. 2 is a graph showing a change of a friction coefficient and endurance of a friction material.
Figure 3:
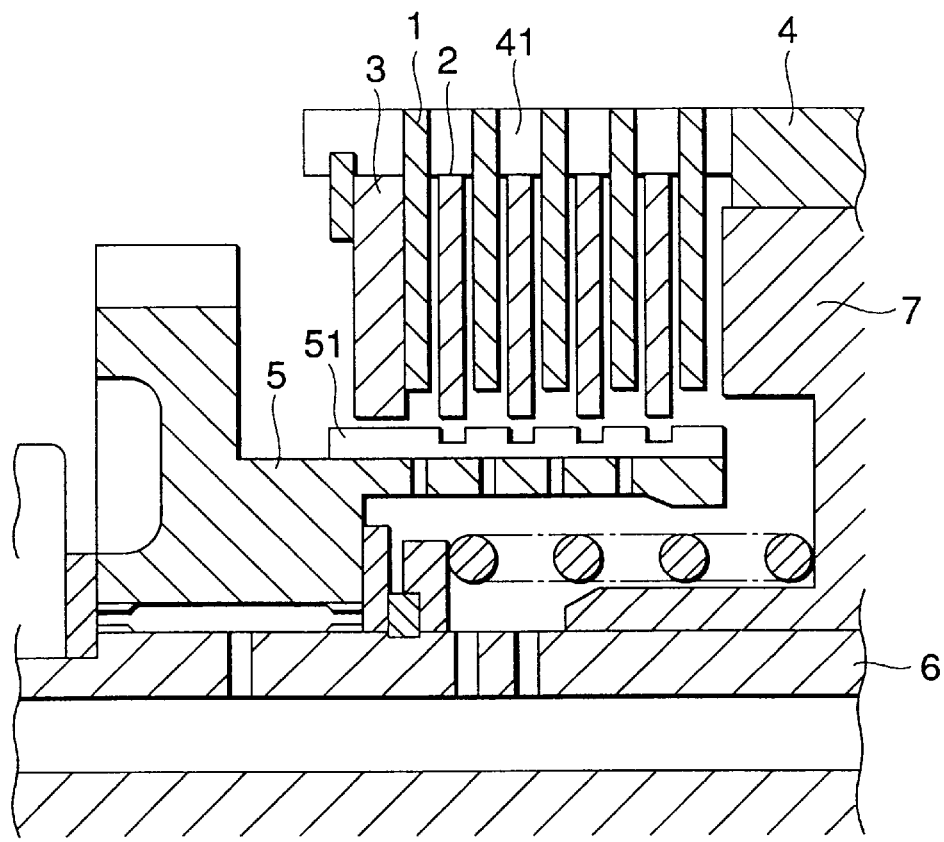
FIG. 3 is a side sectional view of an example of a wet friction engagement device.

FIG. 2 shows a change of the friction coefficient and the endurance of the friction material under the condition of high energy. The ordinate indicates the friction coefficient, and the abscissa indicates the number of cycles (expressed by the number of times). A change of the friction coefficient and the endurance of friction material in each of Examples J-1, J-2, H-1, H-2 and H-3 are shown. The mark X in FIG. 2 indicates a point where the friction plate became impossible to function any longer.

It is apparent that the endurance in Examples H-1, H-2 and H-3 is much longer than that in the conventional Examples J-1 and J-2.

The measuring conditions were as follows:

V=6,500 r.p.m.

P=5 kgf/cm$^2$

I=1.0 kgf·cm·sec

T=100° C.

lubricating system: Axis center oil feeding system

It is preferable to set the length of the carbon fibers to be not longer than 6 mm, properly about 3 mm. With intertwining of the carbon fibers, the strength of the paper increases, and the paper can be manufactured thinly. At the time of mixing raw materials, the carbon fibers tend to be broken by stirring. Accordingly, it is possible to use the carbon fibers to be longer than 6 mm. However, its capacity is not changed. Further, if its length is long, the cost is raised.

In the present invention, carbon fibers as a main ingredient of a friction material are formed into a wavy shape, and compounded suitably with synthetic organic fibers as a reinforcing material, as mentioned above. Accordingly, it is possible to stabilize the frictional properties with respect to thermal changes. With reduction of the amount of synthetic organic resin used, it is possible to reduce the price. In addition, it is possible to keep the strength of a driving plate.

Further, it is possible to keep pores large, because it is considered that the wavy shape or the curly shape of the fibers effects to make the fibers in the friction material three-dimensionally. Particularly, when the load in the direction to press the friction material during engagement is given, it is possible to secure spaces and keep pores due to the effect of its shape, thereby enhancing the durability and the like. Accordingly, not only oil can be kept sufficiently, but also proper flexibility can be kept, so that the friction coefficient can be kept in a proper value.

What is claimed is:

1. A wet friction material comprising carbon fibers and synthetic organic fibers, said carbon fiber being a main ingredient, and said synthetic organic fiber being a reinforcing material;

wherein said carbon fibers have a wave-shape.

2. A wet friction material according to claim 1, wherein a compounding ratio of each of said carbon fibers and said reinforcing material is within a range from 10 to 50% with respect to paper ingredients.

3. A wet friction material according to claim 1, wherein a length of said carbon fibers is not longer than 6 mm.

4. A wet friction material according to claim 3, wherein the length of said carbon fibers is about 3 mm.

5. A wet friction material according to claim 1, wherein said wave-shaped carbon fibers intertwine with each other or intersect each other at least at one point when paper is made into a sheet in a wet process.

6. A wet friction material according to claim 1, wherein all said carbon fibers are wave-shaped.

7. A wet friction material according to claim 1, wherein at least half of said carbon fibers are wavy.

\* \* \* \* \*